(12) United States Patent
Porte et al.

(10) Patent No.: US 11,685,507 B2
(45) Date of Patent: Jun. 27, 2023

(54) SOUND-ABSORBING PANEL WITH A CELLULAR CORE AND A DE-ICING SYSTEM

(71) Applicant: Airbus Operations S.A.S., Toulouse (FR)

(72) Inventors: Alain Porte, Colomiers (FR); Jacques Lalane, Saint Orens de Gameville (FR)

(73) Assignee: Airbus Operations S.A.S.

( * ) Notice: Subject to any disclaimer, the term of this patent is extended or adjusted under 35 U.S.C. 154(b) by 889 days.

(21) Appl. No.: 16/555,144

(22) Filed: Aug. 29, 2019

(65) Prior Publication Data
US 2020/0070949 A1 Mar. 5, 2020

(30) Foreign Application Priority Data
Sep. 5, 2018 (FR) ...................... 18 57971

(51) Int. Cl.
| | | |
|---|---|---|
| *B64C 1/40* | (2006.01) | |
| *G10K 11/168* | (2006.01) | |
| *F02C 7/047* | (2006.01) | |
| *B64D 33/00* | (2006.01) | |

(Continued)

(52) U.S. Cl.
CPC ............... *B64C 1/40* (2013.01); *B64D 15/12* (2013.01); *B64D 29/00* (2013.01); *B64D 33/00* (2013.01); *F02C 7/047* (2013.01); *G10K 11/168* (2013.01)

(58) Field of Classification Search
CPC .......... B64C 1/40; B64D 15/12; B64D 29/00; B64D 33/00; B64D 2033/0233; B64D 33/02; B64D 2033/0206; B64D 2033/0286; F02C 7/047; G10K 11/168; B32B 3/08; B32B 3/12; B32B 3/266; B32B 3/30; B32B 5/02; B32B 5/028; B32B 1/00; B32B 2250/04; B32B 2250/05; B32B 2307/102; B32B 2307/202; B32B 2307/206;

(Continued)

(56) References Cited

U.S. PATENT DOCUMENTS

| | | | | |
|---|---|---|---|---|
| 3,821,999 A | * | 7/1974 | Guess | ..................... B32B 3/266 428/116 |
| 4,291,079 A | * | 9/1981 | Horn | ........................ B32B 3/12 156/64 |

(Continued)

FOREIGN PATENT DOCUMENTS

| | | |
|---|---|---|
| FR | 2898868 A1 | 9/2007 |
| FR | 2928625 A1 | 9/2009 |
| FR | 2934566 A1 | 2/2010 |

*Primary Examiner* — Medhat Badawi
(74) *Attorney, Agent, or Firm* — Lerner David LLP

(57) ABSTRACT

A sound-absorbing panel includes: an inner skin traversed by holes and intended to be oriented towards a channel in which a fluid flows, a heating mat formed by strips fixed to the inner skin on the side opposite to the channel and oriented in a first direction, wherein two adjacent strips are distant from each other in order to define a slot between them, a base fixed to the strips on the side opposite to the inner skin, wherein the base includes, on the strips side, grooves extending in a second direction different from the first direction and wherein the base has, between two successive grooves, a rib, a cellular core fixed to the base on the side opposite to the strips, and an outer panel fixed to the cellular core on the side opposite to the base.

9 Claims, 2 Drawing Sheets

(51) Int. Cl.
*B64D 29/00* (2006.01)
*B64D 15/12* (2006.01)

(58) Field of Classification Search
CPC ........ B32B 2307/302; B32B 2307/732; B32B 2603/00; B32B 2605/18
See application file for complete search history.

(56) References Cited

U.S. PATENT DOCUMENTS

| | | | | |
|---|---|---|---|---|
| 4,475,624 A * | 10/1984 | Bourland, Jr. | ......... | E04C 2/365 428/116 |
| 4,508,295 A * | 4/1985 | Cattaneo | ................ | B64D 15/16 244/134 A |
| 4,674,714 A * | 6/1987 | Cole | ...................... | B64D 15/04 138/104 |
| 4,688,757 A * | 8/1987 | Cook | ........................ | F16K 1/46 251/210 |
| 4,743,740 A * | 5/1988 | Adee | ...................... | B64D 15/00 219/547 |
| 5,041,323 A * | 8/1991 | Rose | ........................ | B32B 3/266 428/116 |
| 5,194,719 A * | 3/1993 | Merkel | ................... | F01N 3/281 219/205 |
| 5,202,547 A * | 4/1993 | Abe | ...................... | F01N 3/2803 219/205 |
| 5,393,586 A * | 2/1995 | Lipp | ........................ | B01J 35/04 428/116 |
| 5,533,167 A * | 7/1996 | Kondo | ..................... | H05B 3/12 422/174 |
| 6,371,411 B1 * | 4/2002 | Breer | ...................... | F01D 25/04 244/134 B |
| 7,581,378 B2 * | 9/2009 | Brand | ...................... | F02C 7/047 60/39.093 |
| 7,588,212 B2 * | 9/2009 | Moe | ....................... | B64D 15/12 244/134 D |
| 8,240,982 B2 * | 8/2012 | Vauchel | ................... | F02C 7/047 415/119 |
| 8,448,901 B2 * | 5/2013 | Porte | ...................... | B64D 15/04 244/134 B |
| 8,899,512 B2 * | 12/2014 | Vauchel | .................... | F02C 7/24 244/1 N |
| 8,959,768 B2 * | 2/2015 | Vauchel | ................... | H05B 3/28 29/460 |
| 9,604,438 B2 * | 3/2017 | Lumbab | .............. | F01D 25/24 |
| 9,693,166 B2 * | 6/2017 | Herrera | ................. | B32B 37/18 |
| 9,761,216 B2 * | 9/2017 | Nampy | ................... | G10K 11/172 |
| 9,909,471 B2 * | 3/2018 | Mattia | ...................... | F02K 1/827 |
| 9,931,825 B2 * | 4/2018 | Gerken | .................. | B32B 41/00 |
| 10,221,764 B2 * | 3/2019 | Labrecque | ............. | F02C 7/042 |
| 10,458,275 B2 * | 10/2019 | Chilukuri | ............... | F01D 25/02 |
| 10,486,821 B2 * | 11/2019 | Mackin | .................. | F02C 7/047 |
| 10,800,134 B2 * | 10/2020 | Sharon | ...................... | B32B 3/28 |
| 11,125,157 B2 * | 9/2021 | Thomas | ................... | F02K 3/06 |
| 2002/0139900 A1 * | 10/2002 | Porte | ...................... | F02C 7/047 244/134 C |
| 2002/0179773 A1 * | 12/2002 | Breer | ................... | B64D 15/04 244/134 R |
| 2010/0155538 A1 * | 6/2010 | Calder | .................. | B64D 15/12 156/182 |
| 2011/0005188 A1 * | 1/2011 | Roger | ...................... | H05B 3/24 60/39.093 |
| 2011/0120076 A1 * | 5/2011 | Vauchel | ................. | H05B 3/267 60/39.093 |
| 2011/0133035 A1 * | 6/2011 | Vauchel | ................. | F02C 7/047 29/611 |
| 2011/0277749 A1 * | 11/2011 | Miner | ..................... | F24S 10/742 126/643 |
| 2012/0060898 A1 * | 3/2012 | Ahlgren | ................. | F24S 10/20 126/663 |
| 2017/0363094 A1 * | 12/2017 | Kumar | .................. | F04D 29/526 |
| 2020/0070949 A1 * | 3/2020 | Porte | ...................... | B32B 3/12 |

* cited by examiner

SOUND-ABSORBING PANEL WITH A CELLULAR CORE AND A DE-ICING SYSTEM

FIELD OF THE INVENTION

The present invention relates to a sound-absorbing panel with a cellular core and a de-icing system, an air intake structure of an aircraft nacelle comprising such a sound-absorbing panel, a nacelle comprising such an air intake structure and an aircraft comprising at least one such nacelle.

BACKGROUND OF THE INVENTION

Sound-absorbing panels are used in numerous technical fields, notably in the aeronautical field.

An aircraft turbine engine comprises a nacelle in which the engine assembly is housed. The nacelle, which has an annular shape, has an air intake structure at the front.

The air intake structure globally comprises an inner face and an outer face in contact with the external air, whereas the inner face delimits a channel which constitutes the fan duct. The function of the air intake structure is notably to ensure the aerodynamic flow of the air, on the one hand towards the fan duct and on the other hand towards the outside of the nacelle.

The air intake structure conventionally comprises an air intake lip, a front reinforcing frame and an acoustic panel.

The air intake lip has a U-shaped cross section open towards the rear, it forms the outer envelope of the forward part of the air intake structure and it ensures the division of the air between the part which enters into the fan duct and the part which flows around the nacelle.

The front reinforcing frame also has a U-shaped cross section open towards the rear and it is placed inside of and at the rear of the air intake lip. The front reinforcing frame provides the mechanical strength of the front part of the nacelle and helps to preserve its shape and dimensions.

The acoustic panel forms the inner envelope of the nacelle, behind the air intake lip, on the fan duct side. The acoustic panel therefore constitutes a part of the inner face.

The acoustic panel has a structure suitable for attenuating the noise produced by the engine and notably by the fan. This acoustic panel is of the composite sandwich type, and it integrates a cellular core between an inner wall and an outer wall. The inner wall delimits the fan duct and extends the air intake lip, whilst the outer wall is inside the air intake structure but oriented towards the outside of the nacelle.

The volume between the air intake lip and the front reinforcing frame allows the circulation of a hot air flow with ensures the de-icing of the air intake lip.

BRIEF SUMMARY OF THE INVENTION

Although such an air intake structure is entirely satisfactory during its use, it is desirable to find a structure which makes it possible to increase the range of frequencies attenuated and to increase the de-iced and sound-absorbing surface.

An aspect of the present invention relates to a sound-absorbing panel which provides better attenuation of noise and de-icing.

A disclosed sound-absorbing panel comprises:

an inner skin traversed by holes and intended to be oriented towards a channel in which a fluid flows, a heating mat constituted by strips which are fixed to the inner skin on the side opposite to the channel and which are oriented in a first direction, where two adjacent strips are distant from each other in order to leave a slot between them, a base fixed to the strips on the side opposite to the inner skin, where the base comprises, on the strips side, grooves which extend in a second direction different from the first direction and where the base has, between two successive grooves, a rib, a cellular core fixed to the base on the side opposite to the strips, and an outer panel fixed to the cellular core on the side opposite to the base.

Such a sound-absorbing panel thus makes it possible to obtain a de-iced surface and a better attenuation of noise.

Advantageously, the strips are integral with each other.

Advantageously, the first direction and the second direction are perpendicular.

Advantageously, the total thickness of the base at the level of the ribs is at least 4 mm.

Advantageously, each strip comprises an electrically resistive element which heats up when a current passes through it and an electrical insulator in which the resistive element is embedded.

Advantageously, each strip is traversed by a tube in which a heated heat transfer fluid flows.

Advantageously, the inner skin is made from a heat conducting material.

An aspect of the invention also relates to an air intake structure for a nacelle of an aircraft, the air intake structure delimiting a channel and comprising a lip having a U-shaped cross section oriented towards the rear and a first sound-absorbing panel according to one of the preceding variants fixed behind the lip and delimiting the channel.

Advantageously, the air intake structure comprises a second sound-absorbing panel fixed behind the first sound-absorbing panel and comprising a cellular core fixed between an inner skin pierced with holes and oriented towards the channel and an outer panel oriented in the opposite direction.

Another aspect of the invention also relates to a nacelle comprising, at the front, an air intake structure according to one of the preceding variants.

Yes another aspect of the invention relates to an aircraft comprising at least one nacelle according to the preceding variant.

BRIEF DESCRIPTION OF THE DRAWINGS

The features of the invention mentioned above, as well as others, will appear more clearly on reading the following description of an exemplary embodiment, the said description being given with reference to the appended drawings, among which.

DETAILED DESCRIPTION

Figure 1:
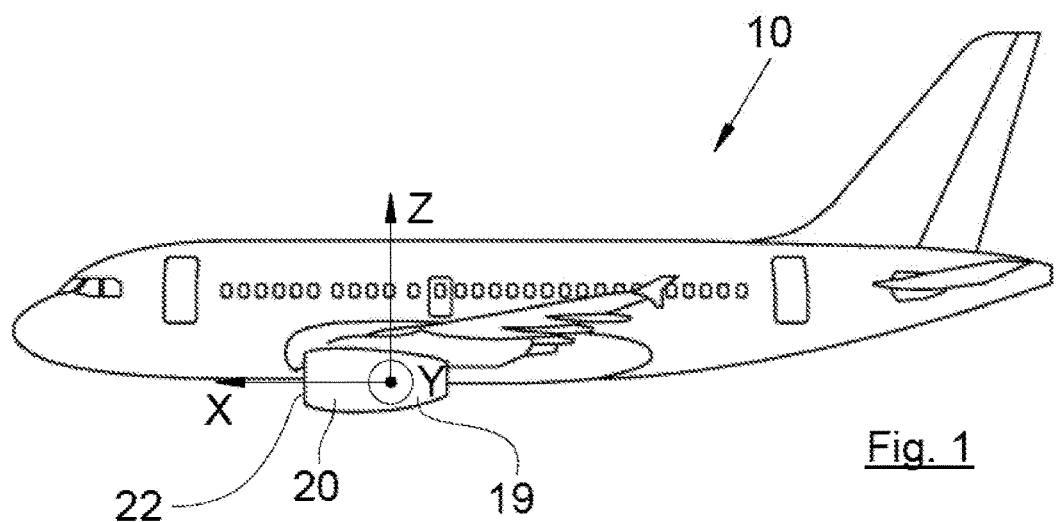
FIG. 1 shows a side view of an aircraft according to the invention.

In the following description, the terms relating to a position are used with reference to an aircraft in a position of forward movement that is to say as it is shown in FIG. 1.

FIG. 1 shows an aircraft 10 which comprises at least one turbine engine 20.

Throughout the following description, by convention the direction X corresponds to the longitudinal direction of the turbine engine 20, this direction being parallel with the longitudinal axis X of the turbine engine 20. On the other hand, the direction Y corresponds to the direction oriented transversely with respect to the turbine engine 20, and the direction Z corresponds to the vertical or height direction, these three directions X, Y, Z being orthogonal with respect to each other.

The turbine engine 20 conventionally comprises a nacelle 19 which comprises at the front an air intake structure 22 comprising a lip which delimits the inside and the outside of the nacelle 19. The lip extends towards the inside by an inner wall which extends around a channel which channels the air towards an engine assembly which comprises, among other things, a fan.

Figure 2:
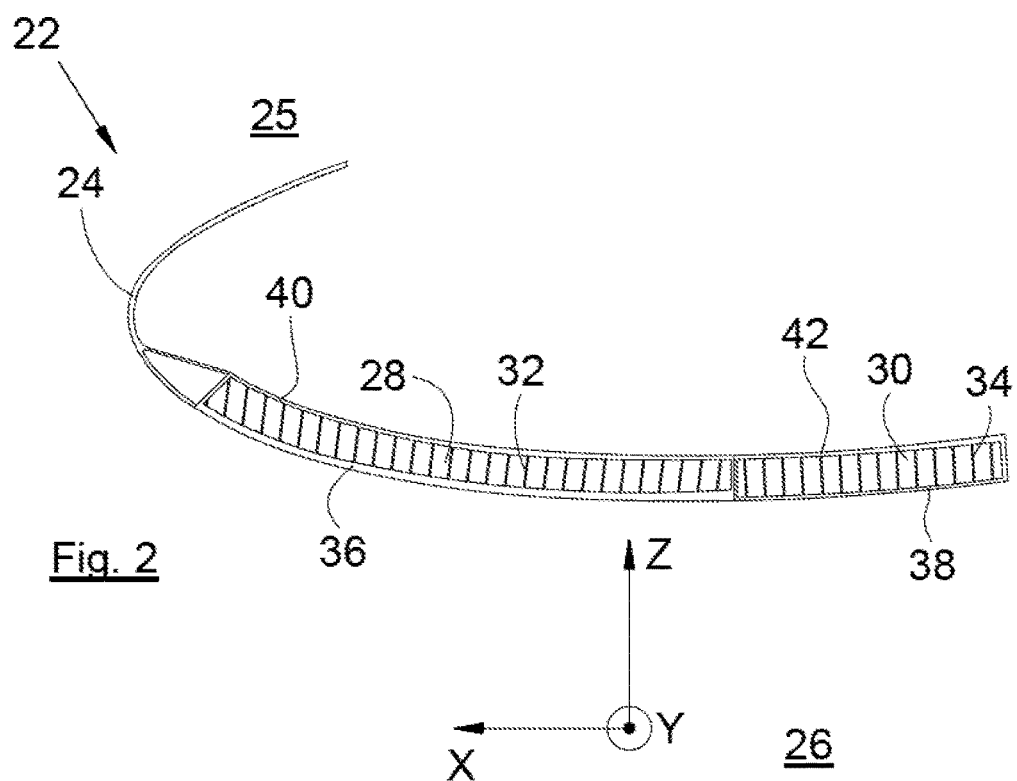
FIG. 2 is a cross-sectional side view of an air intake structure according to the invention.

FIG. 2 shows an air intake structure 22 which comprises a lip 24 which has a U-shaped cross-section oriented towards the rear and which globally has an annular shape. The air intake structure 22 delimits a channel 26 which channels the air towards the engine assembly and in particular towards the fan.

The lip 24 delimits the outside 25 and the inside 26 of the nacelle 19. The inside 26 corresponds to the channel 26.

In the embodiment of the invention described here, the air intake structure 22 comprises around the channel 26 a first sound-absorbing panel 28 and a second sound-absorbing panel 30 which delimit the channel 26. The first sound-absorbing panel 28 is fixed behind the lip 24 up to the second sound-absorbing panel 30. The second sound-absorbing panel 30 is fixed behind the first sound-absorbing panel 28.

In the case of the invention, the reinforcing frame has been eliminated and the air intake structure 22 of the invention is reinforced by the presence of the first sound-absorbing panel 28 which also has structural capabilities.

The second sound-absorbing panel 30 comprises a cellular core 34, which is fixed between an inner skin 38 oriented towards the channel 26 and an outer panel 42 oriented in the opposite direction. The inner skin 38 is pierced with holes allowing sound waves to propagate into the core 34 in order to be attenuated there.

The second sound-absorbing panel 30 is provided for attenuating the high frequencies which range between 1000 and 4000 Hz. For this purpose, the inner skin 38 of the second sound-absorbing panel 30 has a thickness of the order of 0.9 to 2 mm and the holes 46 therefore also have a length of at least 0.9 to 2 mm.

Figure 3:
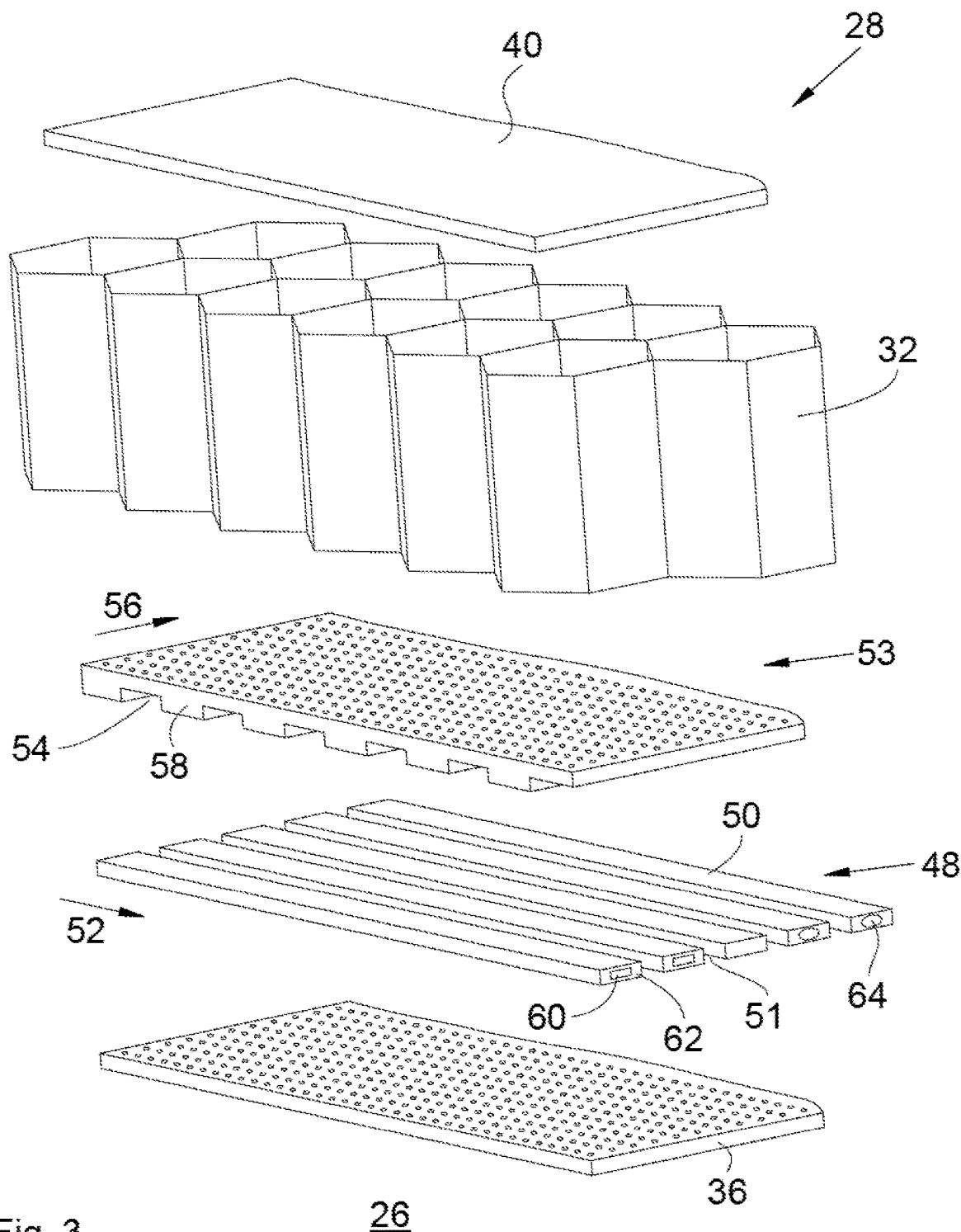
FIG. 3 is an exploded perspective view of a sound-absorbing panel according to the invention.

FIG. 3 shows an exploded view of the first sound-absorbing panel 28.

The first sound-absorbing panel 28 comprises an inner skin 36 oriented towards the channel 26 and traversed by holes allowing sound waves to propagate through the inner skin 36. In general, the inner skin 36 is intended to be oriented towards a channel 26 in which a fluid flows. The inner skin 36 can for example be of the porous element type such as a porous fabric or a trellis.

The first sound-absorbing panel 28 also comprises a heating mat 48 which is constituted by strips 50 which are fixed to the inner skin 36 on the side opposite to the channel 26. All of the strips 50 are oriented in a first direction 52. Two adjacent strips 50 are distanced from each other in order to leave a slot 51 between them. The holes of the inner skin 36 open into these slots 51 which allow the progression of the sound waves.

The heating mat 48 makes it possible to de-ice the face of the inner skin 36 which is in the channel 26.

The first sound-absorbing panel 28 also comprises a base 53 which is fixed to the strips 50 on the side opposite to the inner skin 36. The base 53 comprises, on the strips 50 side, grooves 54 which extend in a second direction 56 different from the first direction 52 and more particularly perpendicular to the first direction 52. The base 53 thus has, between two successive grooves 54, a rib 58 parallel with the second direction 56. The base 53 thus bears onto the strips 50 by the ribs 58.

The base 53 is also traversed by holes which allow the progression of the sound waves.

The total thickness of the base 53 at the level of the ribs 58 is of the order of 0.9 mm to 5 mm and the depths of the holes which traverse the ribs 58 are therefore also equal to 0.9 to 5 mm. The thickness of the base 53 at the level of the grooves 54 is for example of the order of 0.3 to 0.9 mm and the holes which traverse it therefore also have a depth of 0.3 to 0.9 mm. According to a particular embodiment, the total thickness of the base 53 at the level of the ribs 58 is at least 4 mm.

The first sound-absorbing panel 28 also comprises a cellular core 32 which is fixed to the base 53 on the side opposite to the strips 50.

The first sound-absorbing panel 28 also comprises an outer panel 40 which is fixed to the cellular core 32 on the side opposite to the base 53.

Such a structure allows a better attenuation of noise because the sound waves will propagate through the inner skin 36, the slots 51, the grooves 54, the base 53 and finally the cellular core 32. The succession of holes having small diameters and of larger spaces (the slots 51 and the grooves 54) creates variations which slow down the sound waves and therefore attenuate the noise.

Moreover, the presence of the slots 51 and of the grooves 54 make it possible to keep the holes open even after the assembly and thus to increase the percentage of open surface.

When the thickness is at least 4 mm, the base 53 at the level of the ribs 58 makes it possible to attenuate the low frequencies which range between 300 and 600 Hz. The volumes of the cells of the cellular core 32 into which the holes of the base 53 emerge and the depths of these holes make it possible to select the frequency to be attenuated. For example, for a hole depth of 4 mm and a cell height of 40 mm, the frequencies around 500 Hz are attenuated.

The attenuation of the sound waves is therefore greater in comparison with the prior art and the range of frequencies attenuated is also extended by the use of sound-absorbing panels based on two different technologies.

The face of the inner skin 36 of the first sound-absorbing panel 28 which is oriented towards the channel 26 is flush with the face of the inner skin 38 of the second sound-absorbing panel 30 which is oriented towards the channel 26 in order to produce an aerodynamic surface.

The inner skin 38 of the second sound-absorbing panel 30 also preferably comprises a heat source which is embedded in the mass of the said inner skin 38.

Each strip 50 comprises for example an electrically resistive element 60 which heats up when a current traverses it and an electrical insulator 62 in which the resistive element 60 is embedded.

Each strip 50 can be traversed by a tube 64 in which a heat-transfer fluid flows, such as hot air for example.

In order to facilitate the propagation of heat, the inner skin 36 is made from a heat-conducting material.

It is possible to dispose a heat insulator on certain sides of the strips 50 in order to limit the propagation of heat in certain directions. It is also possible to dispose heat conductors on certain sides of the strips 50 in order to facilitate the propagation of heat in certain directions.

Figure 4:
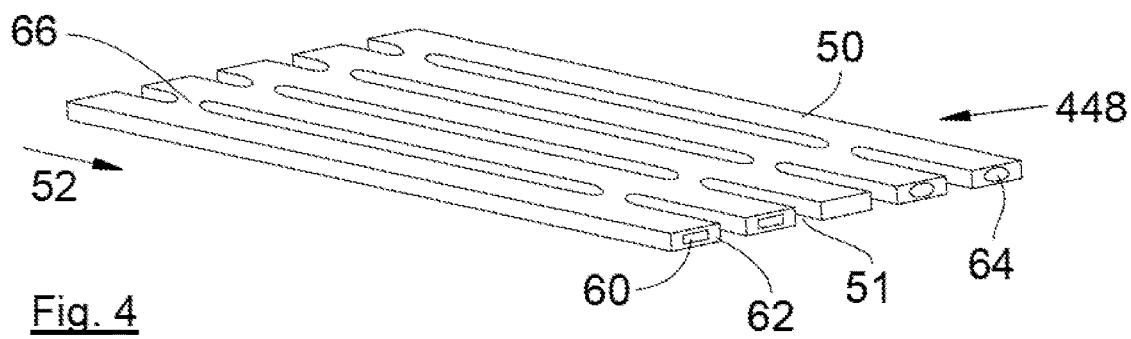
FIG. 4 is a perspective view of a heating mat according to a variant embodiment.

FIG. 4 shows a heating mat 448 according to a particular embodiment, in which, in order to facilitate the handling of the heating mat 448, the strips 50 are integral with each other for example by means of bridges 66 which traverse the slots 51. The heating mat 448 thus becomes an open-work sheet.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. An air intake structure for a nacelle of an aircraft, the air intake structure delimiting a channel and comprising:
   a lip having a U-shaped cross section oriented towards the rear;
   a first sound-absorbing panel fixed behind the lip and delimiting the channel, the first sound-absorbing panel comprising:
      a first inner skin traversed by holes and oriented towards a channel in which a fluid flows;
      a heating mat comprising a plurality of strips fixed to the first inner skin on the side opposite to the channel and oriented in a first direction, where two adjacent strips are distant from each other in order to define a slot between them;
      a base fixed to the plurality of strips on the side opposite to the first inner skin, where the base comprises, on the strips side, grooves extending in a second direction different from the first direction and where the base has, between two successive grooves, a rib;
      a cellular core fixed to the base on the side opposite to the strips; and
      a first outer panel fixed to the cellular core on the side opposite to the base;
   a second sound-absorbing panel fixed behind the first sound-absorbing panel and comprising a cellular core fixed between a second inner skin pierced with holes and oriented towards the channel and a second outer panel oriented in the opposite direction,
   wherein the first sound-absorbing panel is configured to attenuate a first range of frequencies and the second sound-absorbing panel is configured to attenuate a second range of frequencies, and
   wherein the second range of frequencies is higher than the first range of frequencies.

2. The air-intake structure according to claim 1, wherein the plurality of strips is integral with each other.

3. The air-intake structure according to claim 1, wherein the first direction and the second direction are perpendicular.

4. The air-intake structure according to claim 1, wherein the total thickness of the base at the level of the ribs is at least 4 mm.

5. The air-intake structure according to claim 1, wherein each of the plurality of strips comprises an electrically resistive element configured to heat up when a current passes through the electrically resistive element and an electrical insulator in which the electrically resistive element is embedded.

6. The air-intake structure according to claim 1, wherein each of the plurality of strips is traversed by a tube in which a heated heat transfer fluid flows.

7. The air-intake structure according to claim 1, wherein the first inner skin is made from a heat conducting material.

8. A nacelle comprising, at the front, an air intake structure according to claim 1.

9. An aircraft comprising at least one nacelle according to claim 8.

* * * * *